US012597726B2

(12) United States Patent
Stack et al.

(10) Patent No.: US 12,597,726 B2
(45) Date of Patent: Apr. 7, 2026

(54) CONNECTOR WITH CONDUCTIVE LAYER

(71) Applicant: TE Connectivity Solutions GmbH, Schaffhausen (CH)

(72) Inventors: Daniel Stack, Winston Salem, NC (US); Sterling Vaden, Winston Salem, NC (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 334 days.

(21) Appl. No.: 18/318,803

(22) Filed: May 17, 2023

(65) Prior Publication Data

US 2024/0388031 A1 Nov. 21, 2024

(51) Int. Cl.
*H01R 13/04* (2006.01)
*H01R 103/00* (2006.01)

(52) U.S. Cl.
CPC ......... *H01R 13/04* (2013.01); *H01R 2103/00* (2013.01)

(58) Field of Classification Search
CPC .. H01R 13/6599; H01R 24/005; H01R 13/04; H01R 13/02; H01R 13/502–504; H01R 13/6597
USPC ................................ 439/884, 886, 889–891
See application file for complete search history.

(56) References Cited

U.S. PATENT DOCUMENTS

| | | | | |
|---|---|---|---|---|
| 9,559,552 | B2 * | 1/2017 | Harwath | H02J 50/05 |
| 9,666,985 | B2 * | 5/2017 | Bernardi | H01R 13/6477 |
| 11,336,047 | B2 * | 5/2022 | Kliever | H01R 13/111 |
| 2014/0017940 | A1 * | 1/2014 | Chen | H01R 13/6477 439/607.02 |
| 2017/0338595 | A1 | 11/2017 | Girard, Jr. | |
| 2021/0288446 | A1 * | 9/2021 | Oh | H01R 43/007 |

* cited by examiner

*Primary Examiner* — Abdullah A Riyami
*Assistant Examiner* — Amara Anderson

(57) ABSTRACT

A connector includes a dielectric having a mating face, an inner contact disposed in the dielectric, and a conductive layer disposed on or within the mating face. The conductive layer is electrically isolated from the inner contact.

20 Claims, 11 Drawing Sheets

CONNECTOR WITH CONDUCTIVE LAYER

FIELD OF THE INVENTION

The present invention relates to a connector and, more particularly, to a connector having a dielectric with a conductive layer.

BACKGROUND

Mating connectors commonly each have a dielectric, an inner contact disposed in the dielectric, and an outer contact disposed around the dielectric. When the connectors are mated, the inner contacts are connected and the outer contacts are connected. The outer contacts are isolated from the inner contacts to provide shielding for the inner contacts. The inner contacts, for example, include a socket contact and a pin contact received in the socket contact to form the electrical connection.

These mating connectors are designed to meet a target impedance, which is influenced by a gap at a mating interface between the dielectrics and by the geometries of the dielectrics and the inner contacts. The pin contact, for example, often has a reduced diameter in order to be received in the socket contact, but the reduced diameter creates a high impedance condition that causes signal wave reflection and poor performance of the connectors. Maintaining the target impedance of the mating connectors for workable geometries of the dielectrics and inner contacts has proven difficult.

SUMMARY

A connector includes a dielectric having a mating face, an inner contact disposed in the dielectric, and a conductive layer disposed on or within the mating face. The conductive layer is electrically isolated from the inner contact.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
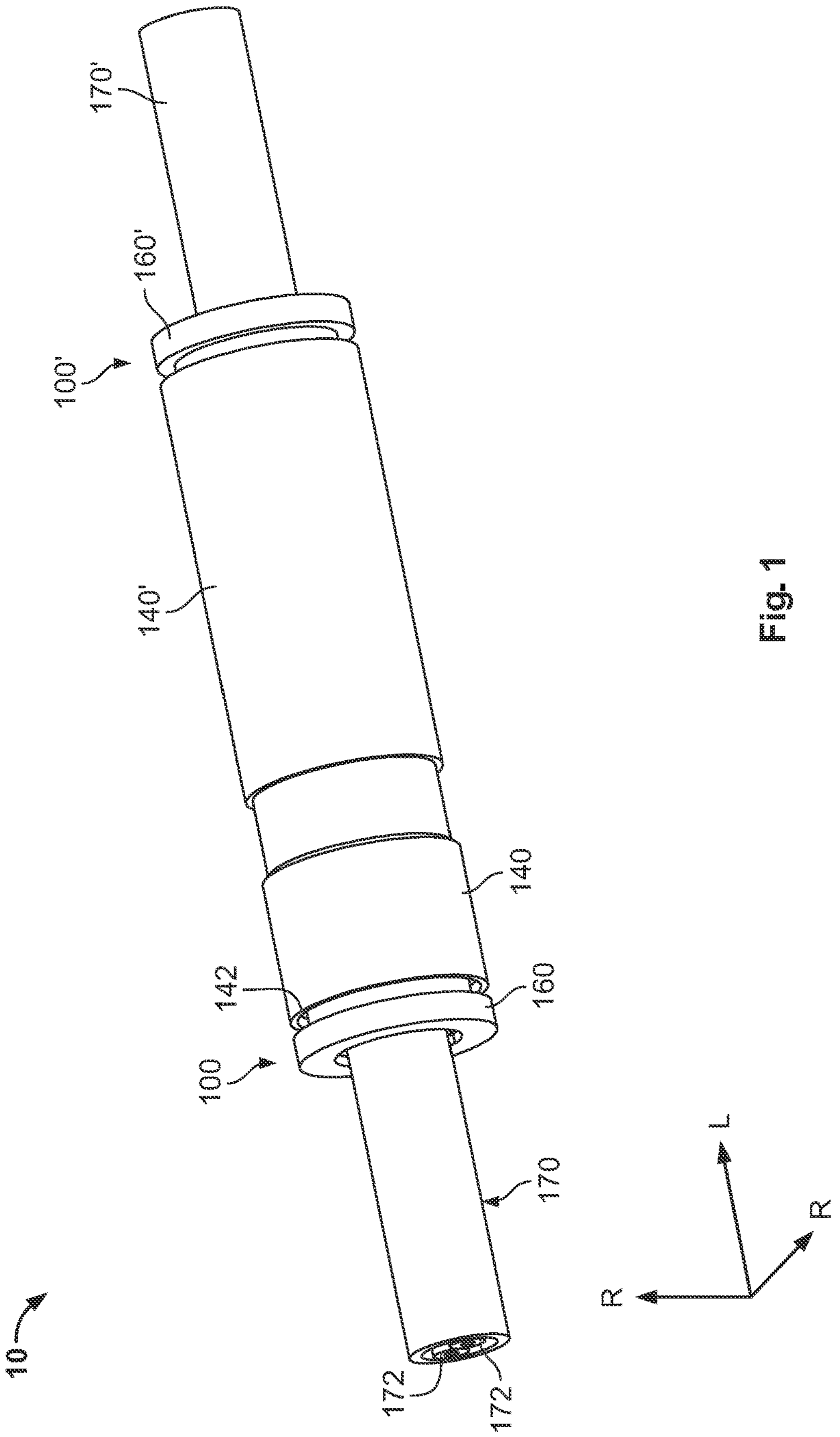
FIG. 1 is a perspective view of a connector system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Throughout the specification, directional descriptors are used such as "longitudinal direction" and "radial direction". These descriptors are merely for clarity of the description and for differentiation of the various directions. These directional descriptors do not imply or require any particular orientation of the disclosed elements.

A connector system 10 according to an embodiment, as shown in FIG. 1, includes a connector 100 and a mating connector 100' matable with the connector 100. The connector 100 will first be described in greater detail below.

Figure 2:
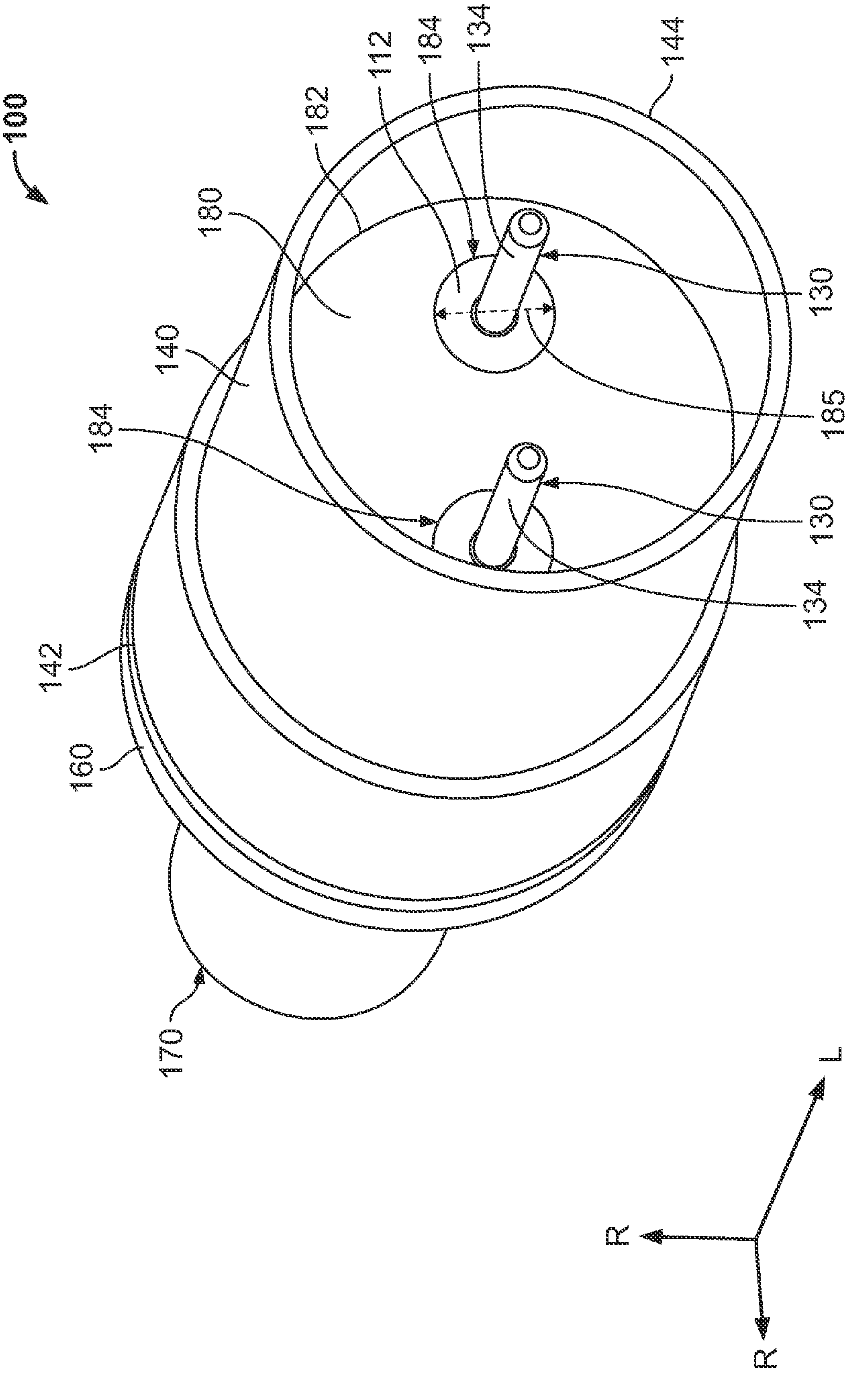
FIG. 2 is a perspective view of a connector of the connector system according to an embodiment.
Figure 3:
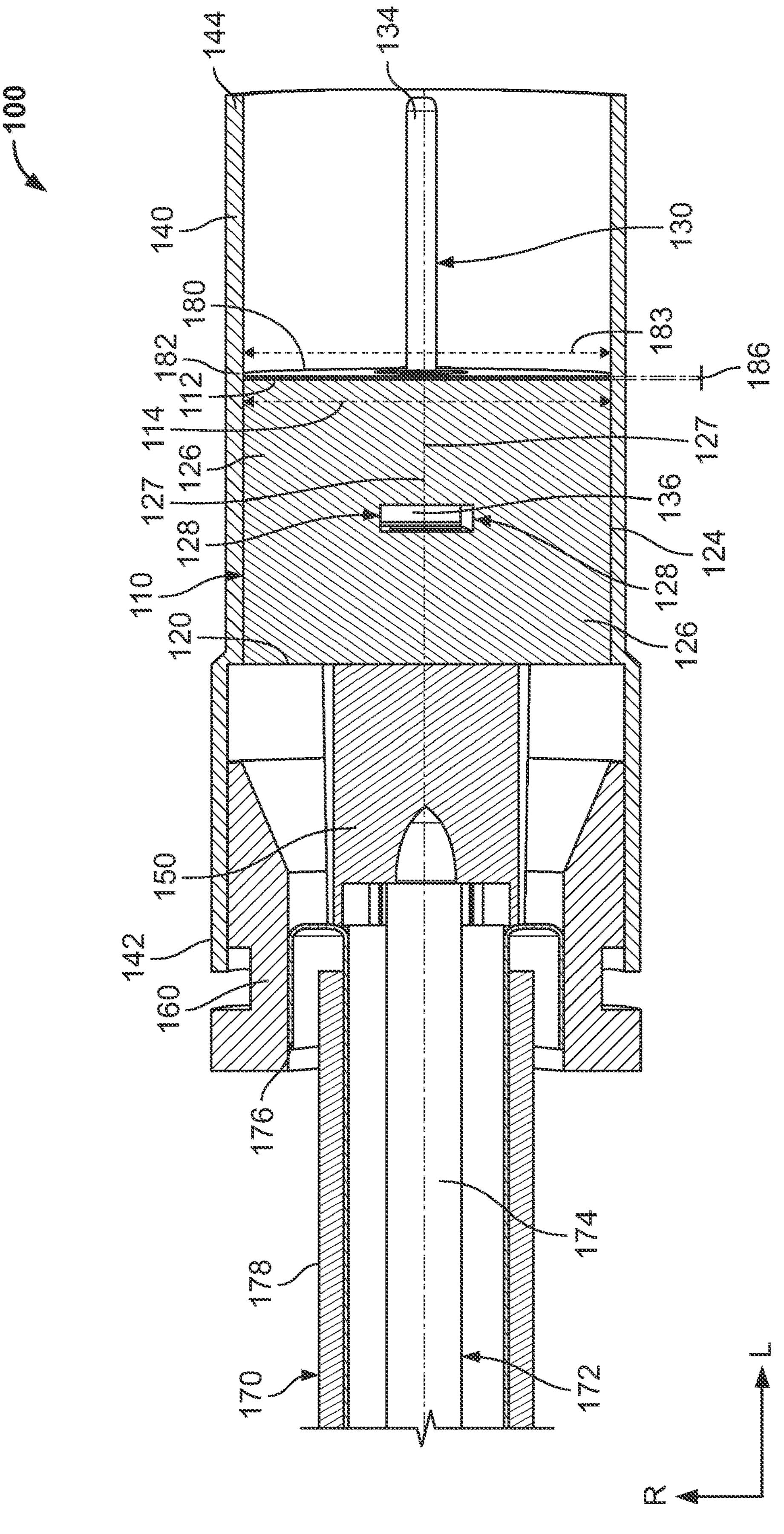
FIG. 3 is a sectional side view of the connector of FIG. 2.

The connector 100, as shown in FIGS. 1-3, includes a dielectric 110, an inner contact 130 disposed in the dielectric 110, an outer contact 140 disposed around the dielectric 110, a ferrule 150 disposed on a side of the dielectric 110, a retainer 160 disposed around the ferrule 150, a cable 170 extending through the retainer 160 and the ferrule 150, and a conductive layer 180 disposed on or within the dielectric 110.

Figure 4:
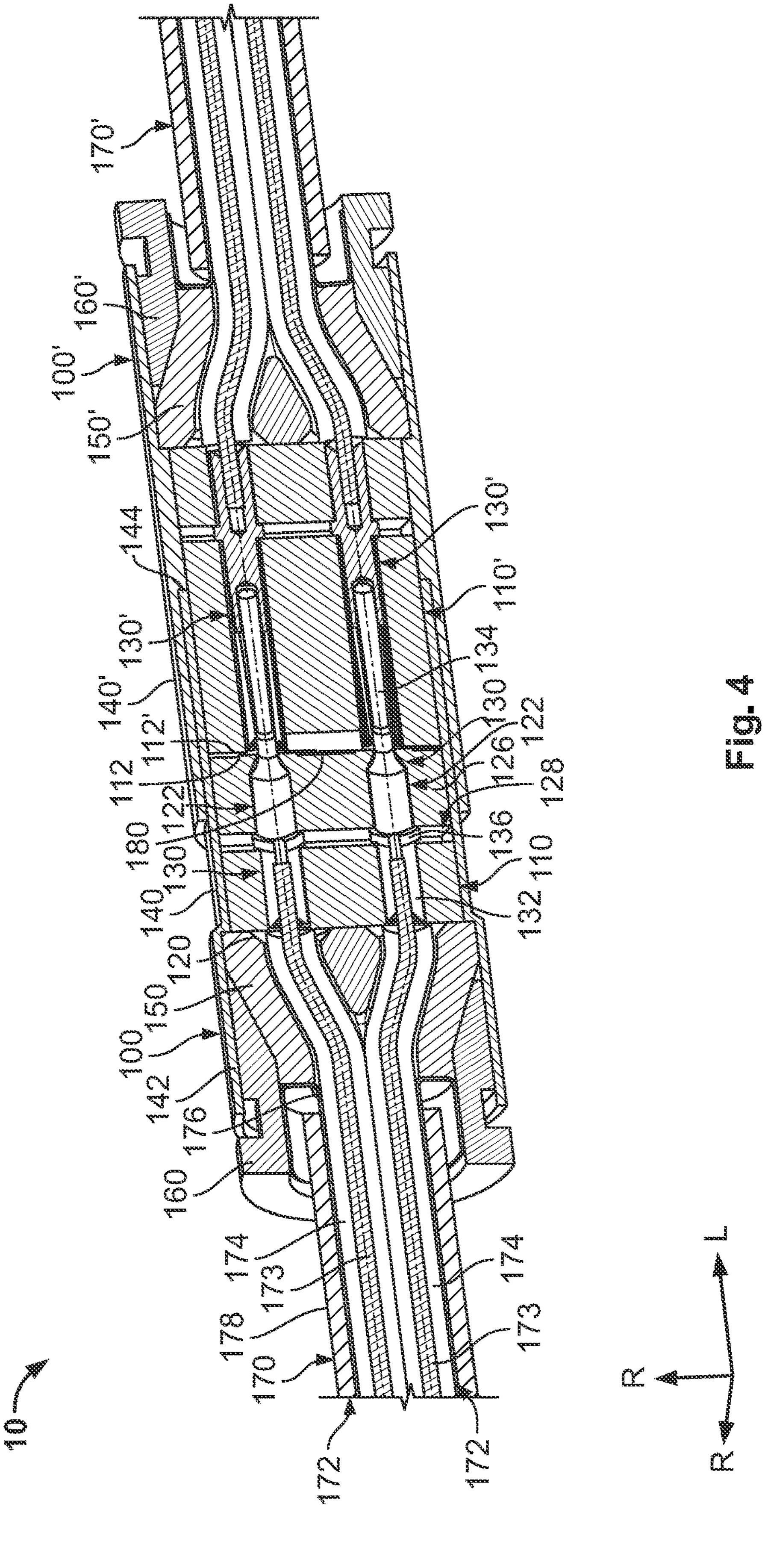
FIG. 4 is a sectional perspective view of a connector system according to an embodiment.

As shown in FIGS. 2-4, the dielectric 110 has a mating face 112 and a connection face 120 opposite the mating face 112 in a longitudinal direction L. The dielectric 110 has a plurality of contact passageways 122 extending through the dielectric 110 from the connection face 120 to the mating face 112. In the shown embodiment, the dielectric 110 has two contact passageways 122. In other embodiments, the dielectric 110 may have one contact passageway 122 or more than two contact passageways 122.

The dielectric 110 defines an outer surface 124, shown in FIG. 3. In the shown embodiment, the outer surface 124 has a circular cross-section. In other embodiments, the outer surface 124 can have a square, rectangular, oval, or any other shaped cross section based on the overall shape of the connector 100.

The dielectric 110 is formed from an electrically insulative material, such as a plastic. As shown in the embodiment of FIG. 3, the dielectric 110 may be formed in a pair of halves 126 that are assembled together in a radial direction R perpendicular to the longitudinal direction L; exemplary radial directions R are shown in the drawings, but the radial direction R could be any direction perpendicular to the longitudinal direction L. Each of the pair of halves 126 of the dielectric 110 has a portion of the mating face 112, a portion of the connection face 120, a portion of each of the contact passageways 122, and defines a portion of the outer surface 124 of the dielectric 110. The pair of halves 126, as shown in FIG. 3, each have a connection surface 127 facing one another at which the halves 126 abut and are connected to each other. The halves 126 each have a groove 128 extending into the connection surface 127 in the radial direction R. In other embodiments, each half 126 of the dielectric 110 may have any other structure that is capable of securing the inner contacts 130, such as a latch. In other embodiments, the dielectric 110 may be formed in one piece or more than two pieces assembled together, provided that the dielectric 110 has the components described according to the various embodiments herein.

The inner contact 130, as shown in FIGS. 2-4, has a connection end 132 and a mating end 134 opposite the connection end 134 in the longitudinal direction L. The inner contact 130 has a shoulder 136 disposed between the connection end 132 and the mating end 134 and protruding in the radial direction R. The inner contact 130 is formed of a conductive material, such as a metal. In the shown embodiment, the inner contact 130 is monolithically formed in a single piece, but could alternatively be formed in a plurality of pieces assembled together to form the inner contact 130 as described herein.

In the embodiment shown in FIGS. 2-4, the mating end 134 of the inner contact 130 is a pin and the connector 100 is a male connector. In other embodiments, the mating end 134 could be a socket receiving a pin and the connector 100 could be a female connector. The connection end 132 can be any type of element capable of forming a mechanical and electrical connection with a conductor of a cable.

The connector 100 according to the shown embodiment has two inner contacts 130. The number of inner contacts 130 corresponds to the number of contact passageways 122 of the dielectric 110 and, in other embodiments, the connector 100 could have one inner contact 130 with one contact passageway 122 in the dielectric 110, or could have three or more inner contacts 130 with a corresponding number of contact passageways 122, depending on the application.

The outer contact 140, as shown in FIGS. 2 and 3, extends from a base end 142 to a protruding end 144 along the longitudinal direction L. The outer contact 140, the ferrule 150, and the retainer 160 are each formed of a conductive material, such as a metal.

In the embodiment shown in FIGS. 1-5, the cable 170 of the connector 100 is a shielded twisted pair cable and includes a pair of wires 172 each having a conductor 173 and an inner insulation 174 surrounding the conductor 173. The wires 172 extend next to one another and are surrounded by a braid 176, which is formed of a conductive material. The braid 176 is surrounded by an outer insulation 178. In other embodiments, the cable 170 could have a single wire 172 with a single conductor 173, or the cable 170 could be any other type of cable used in electrical connectors. In another embodiment, the cable 170 may be an unshielded twisted pair omitting the braid 176.

The conductive layer 180 is formed of a conductive material, such as a metal material, a conductive plastic, a foil, or any other type of conductive material that can be formed as described in the embodiments herein. As shown in FIGS. 2 and 3, the conductive layer 180 has an outer perimeter 182 with an outer diameter 183, and a plurality of contact openings 184 extending through the conductive layer 180 and each having an opening diameter 185. The conductive layer 180 has a thickness 186 along the longitudinal direction L. The conductive layer 180 is not limited to the shape and arrangement shown in FIGS. 2 and 3, as numerous other embodiments of the conductive layer 180 will be described in detail below.

The assembly of the connector 100 will now be described in greater detail primarily with reference to FIGS. 2-4.

The inner contacts 130 are each positioned in one of the contact passageways 122 of the dielectric 110, as shown in FIG. 4. In the shown embodiment, the inner contacts 130 are positioned in the portions of the contact passageways 122 of one of the halves 126, and the halves 126 are then connected together to secure the inner contacts 130 in the dielectric 110. The shoulders 136 of the inner contacts 130 are positioned and held in the grooves 128 of the halves 126. The mating end 134 of each of the inner contacts 130 is positioned in alignment with the mating face 112 of the dielectric 110 or protrudes beyond the mating face 112 in the longitudinal direction L, depending on whether the mating end 134 of the inner contact 130 is a pin or a socket.

The outer contact 140 is disposed around the dielectric 110, as shown in FIGS. 3 and 4. The protruding end 144 extends beyond the mating face 112 of the dielectric 110 in the longitudinal direction L. The dielectric 110 is positioned approximately centrally in the outer contact 140 in the shown embodiment, between the base end 142 and the protruding end 144.

In the embodiment shown in FIGS. 3 and 4, the ferrule 150 is positioned within the outer contact 140 adjacent to the connection face 120 of the dielectric 110. The retainer 160 is positioned within the outer contact 140 at the base end 142 of the outer contact 140 and surrounds a portion of the ferrule 150. The outer contact 140, the ferrule 150, and the retainer 160 are electrically connected.

The cable 170 extends through the retainer 160 and the ferrule 150, as shown in FIG. 4. In the shown embodiment, the wires 172 of the cable 170 are separated in the ferrule 150 by a predetermined separation distance selected for impedance control. The braid 176 of the cable 170, shown in FIG. 3, is electrically connected to the retainer 160. The inner insulation 174 at the end of each of the wires 172 is stripped and the exposed conductor 173 of each of the wires 172 extends into the dielectric 110. The conductor 173 of each of the wires 172 is electrically and mechanically connected to the connection end 132 of one of the inner contacts 130 within the dielectric 110.

In the embodiment of the connector 100 shown in FIGS. 2 and 3, the conductive layer 180 is disposed on the mating face 112 of the dielectric 110 and extends in a plane in the radial direction R parallel to the mating face 112. Each of the contact openings 184 is positioned around one of the inner contacts 130 disposed in one of the contact passageways 122. The opening diameter 185 of each of the contact openings 184, shown in FIG. 2, is sufficiently large that the conductive layer 180 is electrically isolated from each of the inner contacts 130.

In the embodiment of FIGS. 2 and 3, the outer perimeter 182 of the conductive layer 180 has an outer diameter 183 that is approximately equal to an outer diameter 114 of the mating face 112. The conductive layer 180 is electrically connected to the outer contact 140 disposed around the dielectric 110 in this embodiment. In an embodiment, the conductive layer 180 can be monolithically formed in a single piece with the outer contact 140. In other embodiments, the conductive layer 180 can be formed separately from the outer contact 140 and the outer perimeter 182 of the conductive layer 180 can be electrically connected to the outer contact 140 in a permanent or mechanically separable manner, such as by crimping, soldering, press-fitting, spring contacts between the outer perimeter 182 and the outer contact 140, or any other type of permanent or mechanically separable electrical connection.

Figure 5:
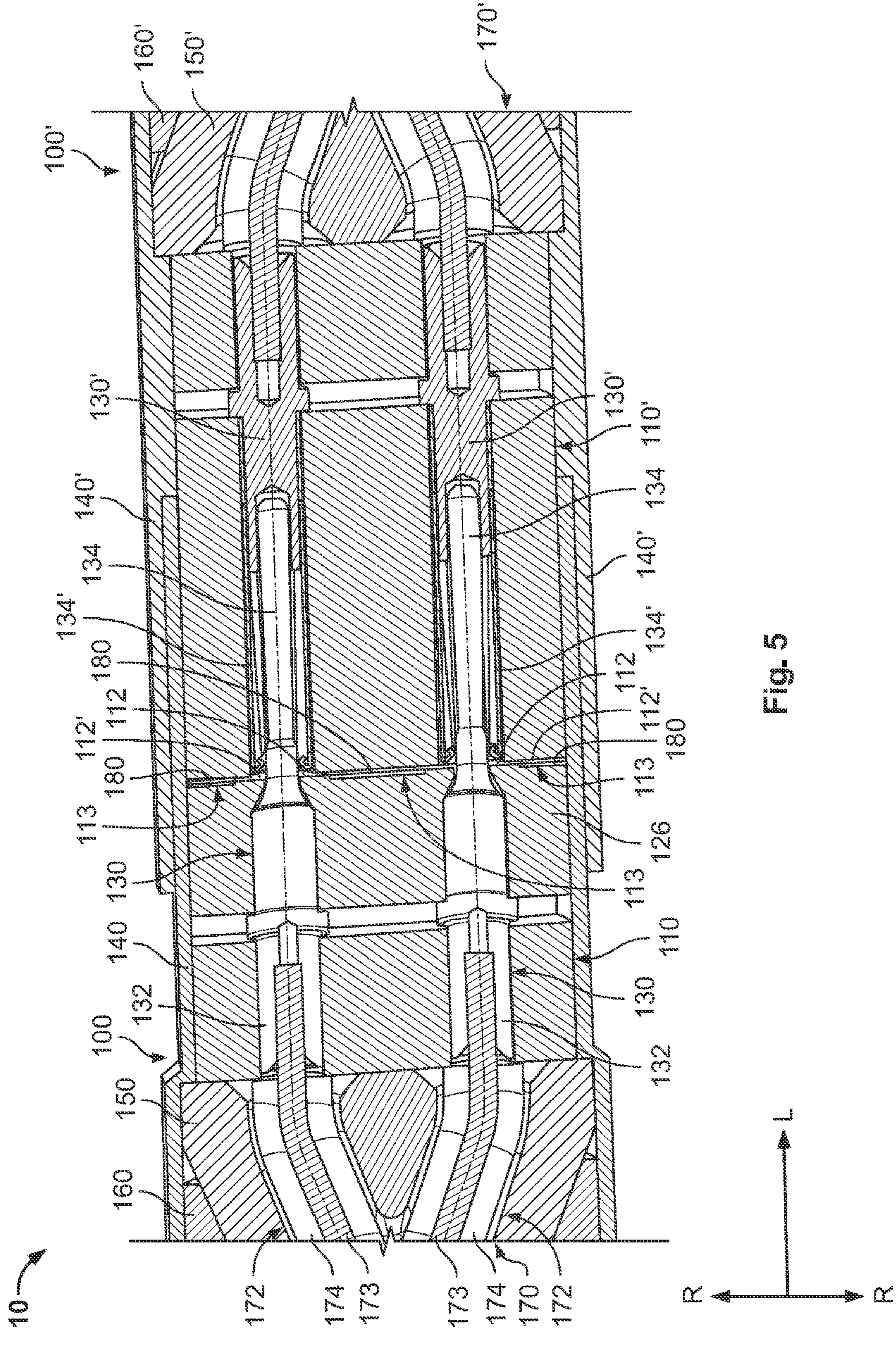
FIG. 5 is a detail sectional perspective view of a portion of the connector system of FIG. 4.

In another embodiment shown in FIG. 5, the mating face 112 has a recess 113 that extends around the contact passageways 122. The conductive layer 180 is disposed within the recess 113. In the shown embodiment, the recess 113 has a depth in the longitudinal direction L that is equal to the thickness 186 of the conductive layer 180; the conductive layer 180 is flush with the mating face 112 in the radial direction R.

In the connector system 10, the mating connector 100', shown in FIGS. 1, 4, and 5, includes the same elements as the connector 100 described above except for the conductive layer 180. Like reference numbers will be used for elements of the mating connector 100' that corresponds to elements of the connector 100, with the elements of the mating connector 100' having an added apostrophe for differentiation. Corresponding elements of the mating connector 10' will also be referred to with the same terms as used to describe the connector 100, but with the prefix "mating" added where appropriate. For clarity, all elements of the mating connector 100' that have like reference numbers to the connector 100 have the same corresponding description as the connector 100 unless otherwise described below.

The mating connector 100', as shown in FIGS. 1, 4, and 5, has a mating dielectric 110', at least one mating inner contact 130' disposed in the mating dielectric 110', a mating outer contact 140' disposed around the mating dielectric 110', a mating ferrule 150' disposed at an end of the mating dielectric 110', a mating retainer 160' disposed around the mating ferrule 150', and a mating cable 170' extending through the mating retainer 160' and the mating ferrule 150'. The mating dielectric 110' has a mating face 112' at an end of the mating dielectric 110' opposite the mating ferrule 150' in the longitudinal direction L. In the embodiment of FIGS. 1, 4, and 5, the mating inner contact 130' is a socket contact that receives the pin at the mating end 134 of the inner contact 130; the mating inner contact 130' has a mating end 134' that is adjacent to the mating face 112', as shown in FIG. 5. In other embodiments, the mating inner contact 130' could have the pin and the inner contact 130 could have the socket.

The connector 100 is mated with the mating connector 100' in a mated position of the connector system 10 shown in FIGS. 1, 4, and 5. The outer contact 140 is positioned between the mating dielectric 110' and the mating outer contact 140' in the radial direction R, and the mating outer contact 140' is positioned outside of the outer contact 140 in the radial direction R, as the connector 100 and the mating connector 100' move toward one another along the longitudinal direction L. When the connectors 100, 100' reach the mated position, the outer contacts 140, 140' are electrically connected and the inner contacts 130, 130' are electrically connected and isolated from the outer contacts 140, 140'. The connection of the outer contacts 140, 140' provides shielding for the inner contacts 130, 130'.

In the mated position of the connector system 10 shown in FIGS. 4 and 5, the mating face 112' of the mating dielectric 110' faces the mating face 112 of the dielectric 110. The conductive layer 180 is disposed between the dielectric 110 and the mating dielectric 110'. The conductive layer 180 is electrically isolated from the inner contact 130 of the connector 100 and the mating inner contact 130' of the mating connector 100' due to the contact openings 184 and, in the shown embodiment, is electrically connected to the outer contacts 140, 140'.

In the connector 100 and the connector system 10 of the present invention, the conductive layer 180 according to the various embodiments described herein improves the characteristic impedance at the interface between the mating face 112 of the dielectric 110 and the mating face 112' of the mating dielectric 110'. The conductive layer 180 is isolated from the inner contacts 130, and whether connected to the outer contact 140 or not, reduces the characteristic impedance by reducing the distance between the inner contacts 130 and the proximate conductive elements of the connector 100. This reduction in characteristic impedance improves the performance of the connector 100 and the connector system 10 by reducing the reflection coefficient at an interface between two dissimilar connector geometries.

Other embodiments of the connector 100 and the connector system 10 will now be described in greater detail with reference to FIGS. 6-11. Like reference numbers refer to like elements and primarily the differences of each of the embodiments of FIGS. 6-11 with respect to the embodiments of FIGS. 1-5 will be described in detail below.

Figure 6:
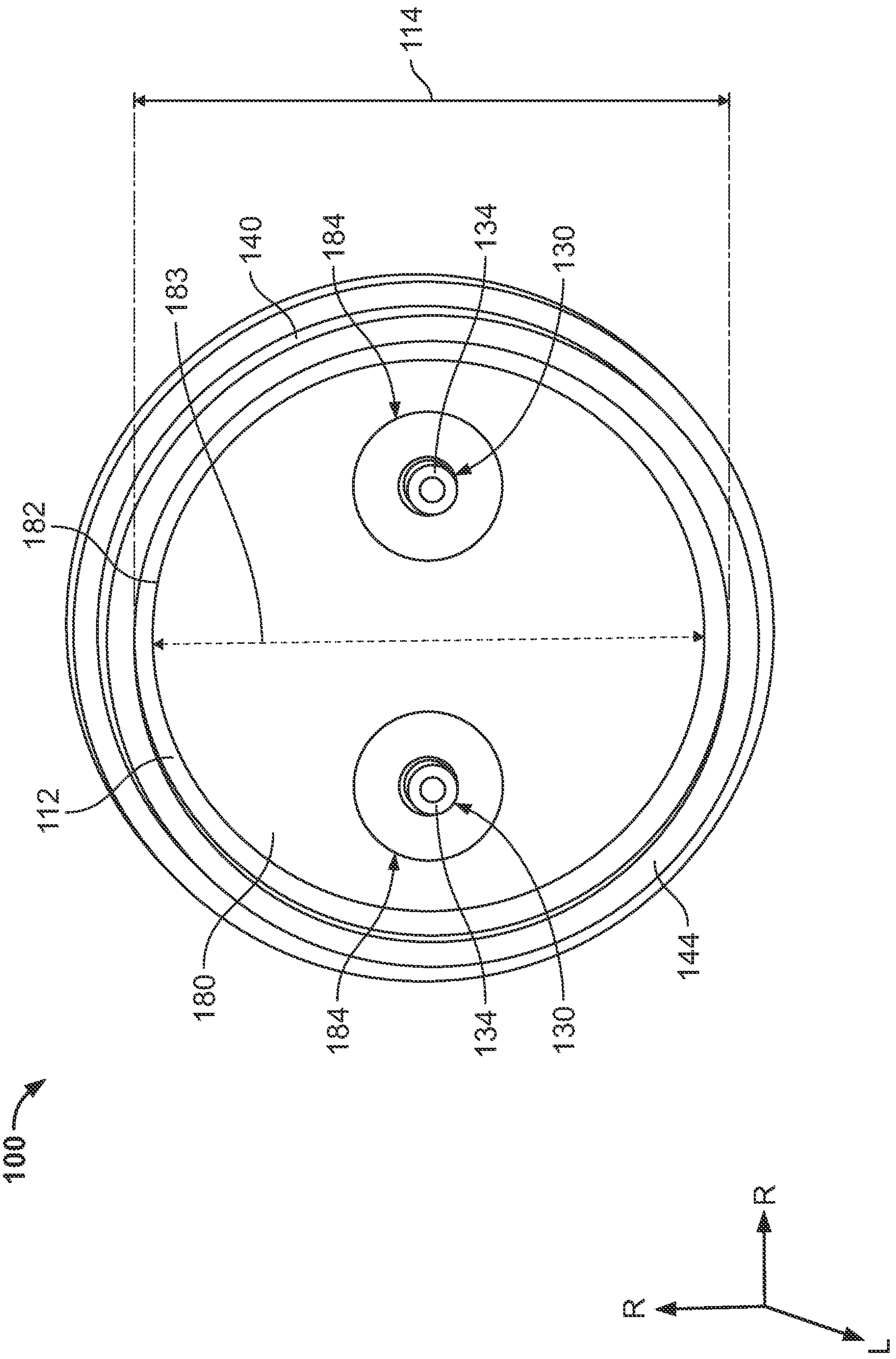
FIG. 6 is a front perspective view of a connector according to another embodiment.

In the embodiment shown in FIG. 6, the conductive layer 180 has an outer perimeter 182 with an outer diameter 183 that is less than the outer diameter 114 of the mating face 112. In this embodiment, the conductive layer 180 is not in contact with the outer contact 140 and is electrically isolated from both the outer contact 140 and the inner contacts 130. Despite the electrical isolation between the conductive layer 180 and the outer contact 140, the conductive layer 180 still improves the impedance of the connector 100 and the connector system 10 as described above.

Figure 7:
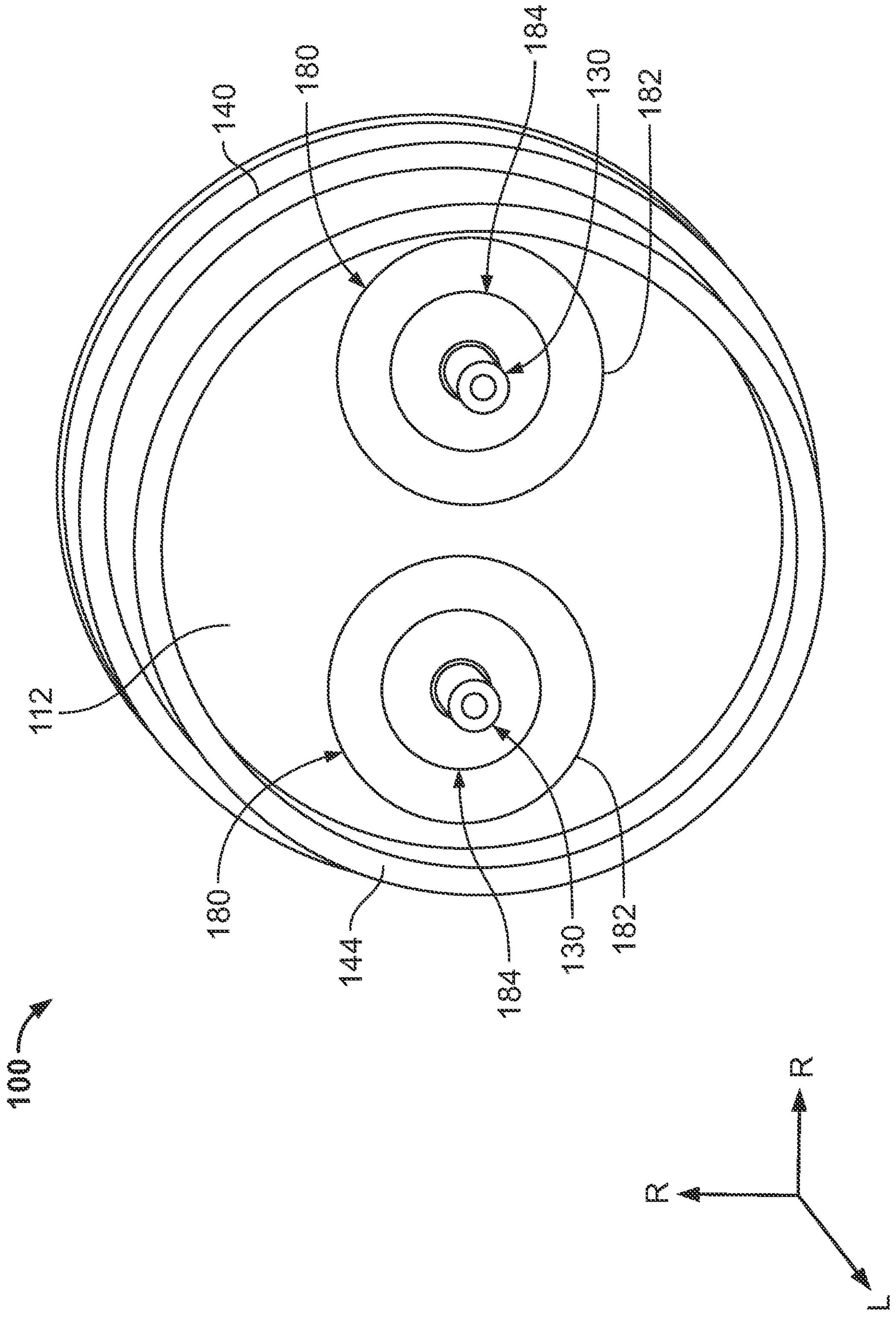
FIG. 7 is a front perspective view of a connector according to another embodiment.

In another embodiment shown in FIG. 7, the conductive layer 180 is one of a plurality of conductive layers 180 separate from one another and disposed on the mating face 112. In this embodiment, each of the conductive layers 180 has one contact opening 184 and is disposed on the mating face 112 around one of the inner contacts 130. The outer perimeter 182 of each of the conductive layers 180 is spaced apart from one another along the mating face 112 and the conductive layers 180 are electrically isolated from one another, from the outer contact 140, and from the inner contacts 130. The number of conductive layers 180 in this embodiment corresponds to the number of inner contacts 130 of the connector 100.

Figure 8:
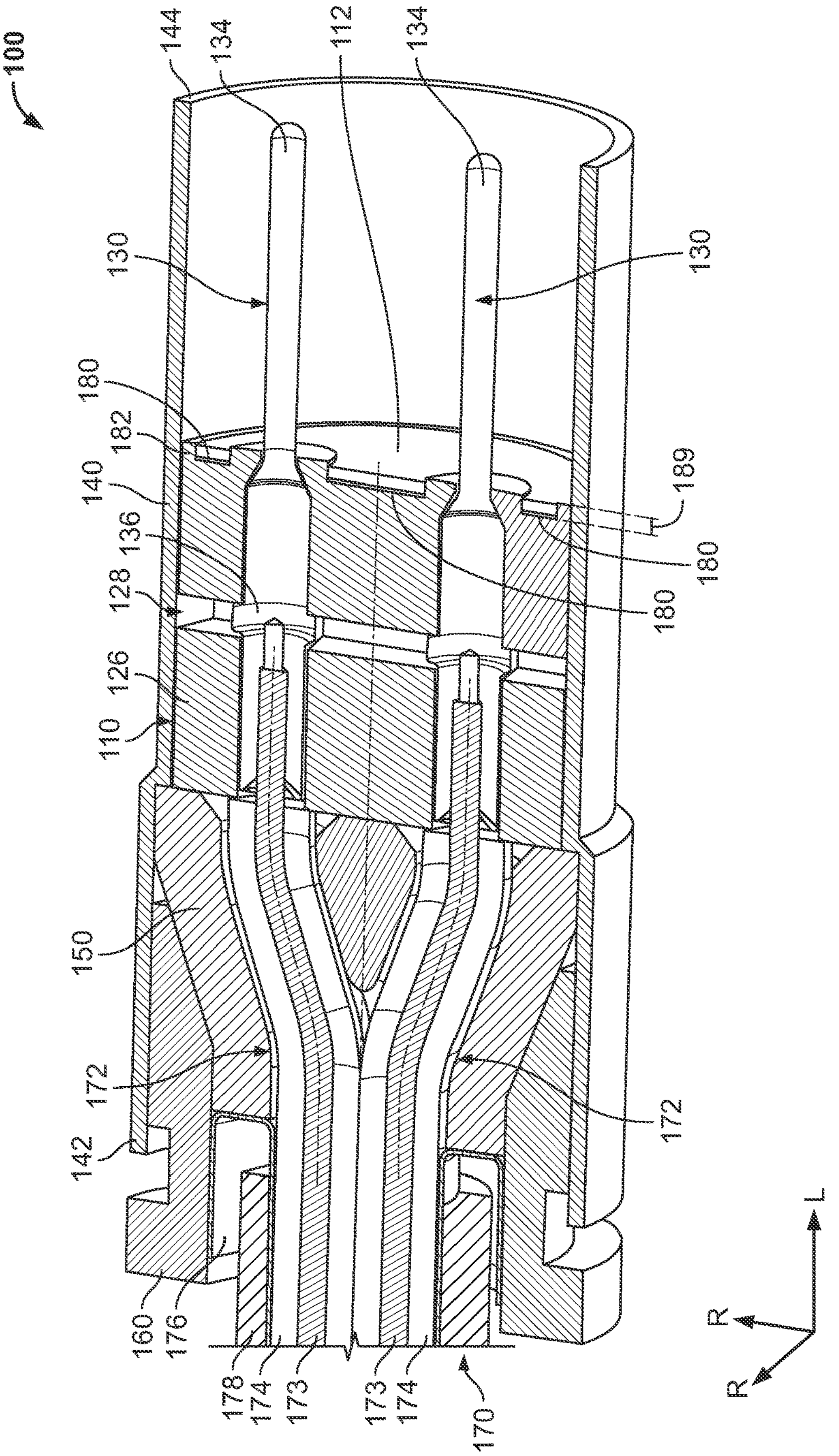
FIG. 8 is a sectional perspective view of a connector according to another embodiment.

As shown in the embodiment shown in FIG. 8, the conductive layer 180 can alternatively be embedded within the dielectric 110 adjacent to the mating face 112. The conductive layer 180 in this embodiment is positioned at an inset distance 189 along the longitudinal direction L from the mating face 112 within the dielectric 110. The dielectric 110 can be molded around the conductive layer 180 in this embodiment or the dielectric 110 can be formed in multiple pieces with the conductive layer 180 inset at shown in FIG. 8. In the embodiment shown in FIG. 8, the conductive layer 180 is formed in one piece and the outer perimeter 182 of the conductive layer 180 is spaced apart from the outer contact 140 in the radial direction R and not connected to the outer contact 140. In other embodiments, the embedding of the conductive layer 180 can be combined with the features of any of the other embodiments described herein, including connecting the conductive layer 180 with the outer contact 140 and forming the conductive layer 180 in multiple pieces.

Figure 9:
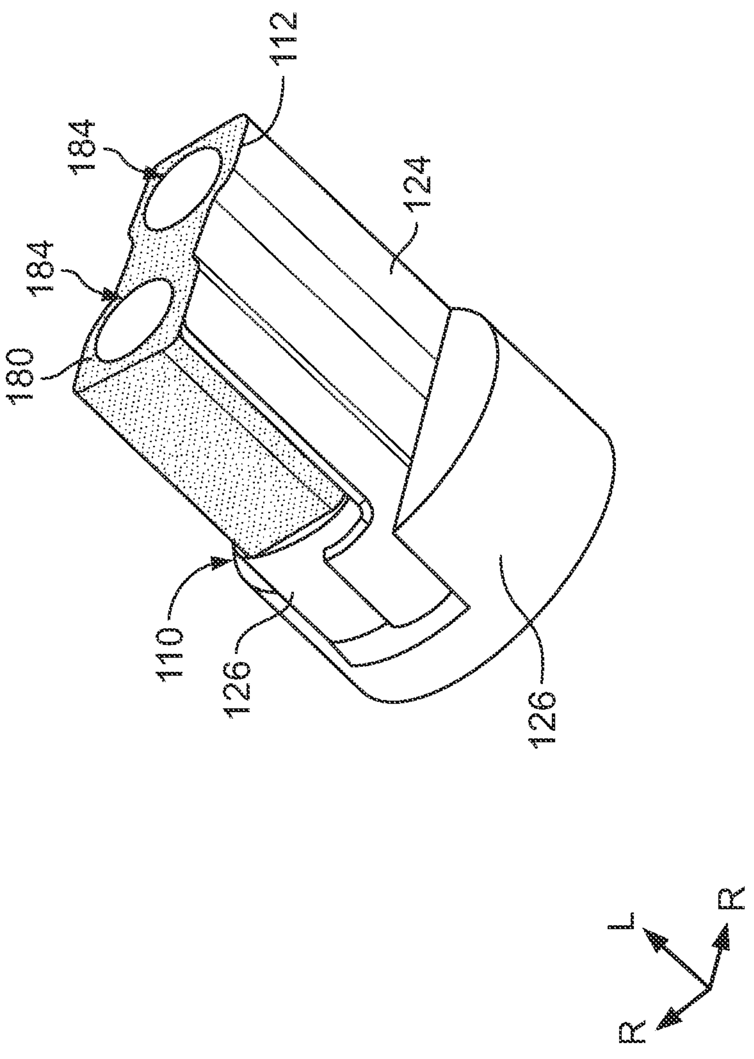
FIG. 9 is a perspective view of a dielectric and a conductive layer of a connector according to another embodiment.
Figure 11:
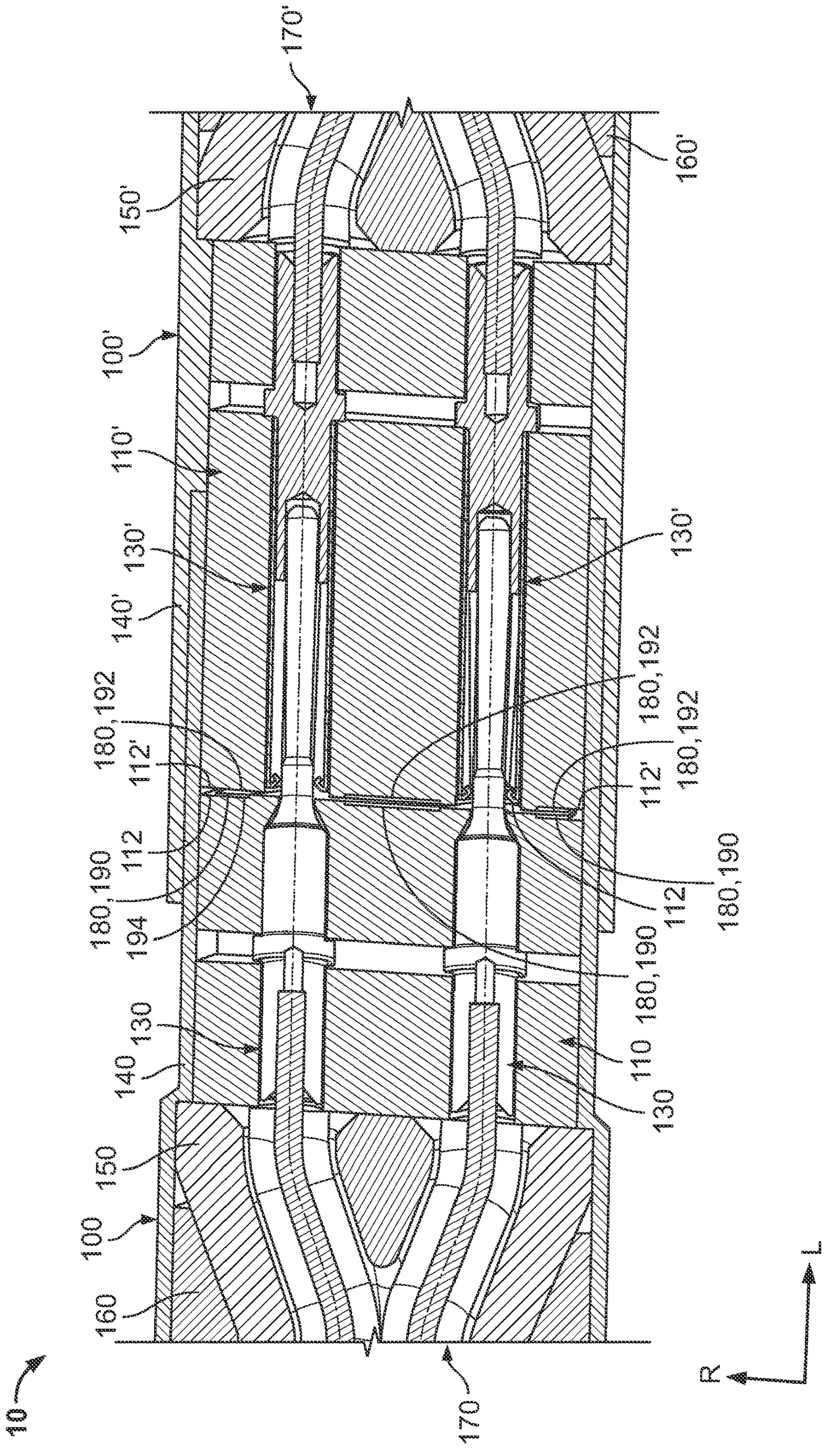
FIG. 11 is a sectional perspective view of a connector system according to another embodiment.

Another embodiment of the application of the conductive layer 180 on the dielectric 110 is shown in FIG. 9. Only the dielectric 110 and the conductive layer 180 are shown in FIG. 9 for clarity of the disclosure. In the embodiment of FIG. 9, the conductive layer 180 is a foil material that is formed around the mating face 112 and the outer surface 124 of the dielectric 110. The foil of the conductive layer 180 can be compressed or crimped around the mating face 112 and the outer surface 124 to retain the conductive layer 180 on the mating face 112 and the dielectric 110. In other embodiments, the conductive layer 180 can be attached to the mating face, for example mechanically by a latch or by press-fitting, with an adhesive layer 194 as shown in FIG. 11, or can be plated on the mating face 112.

Figure 10:
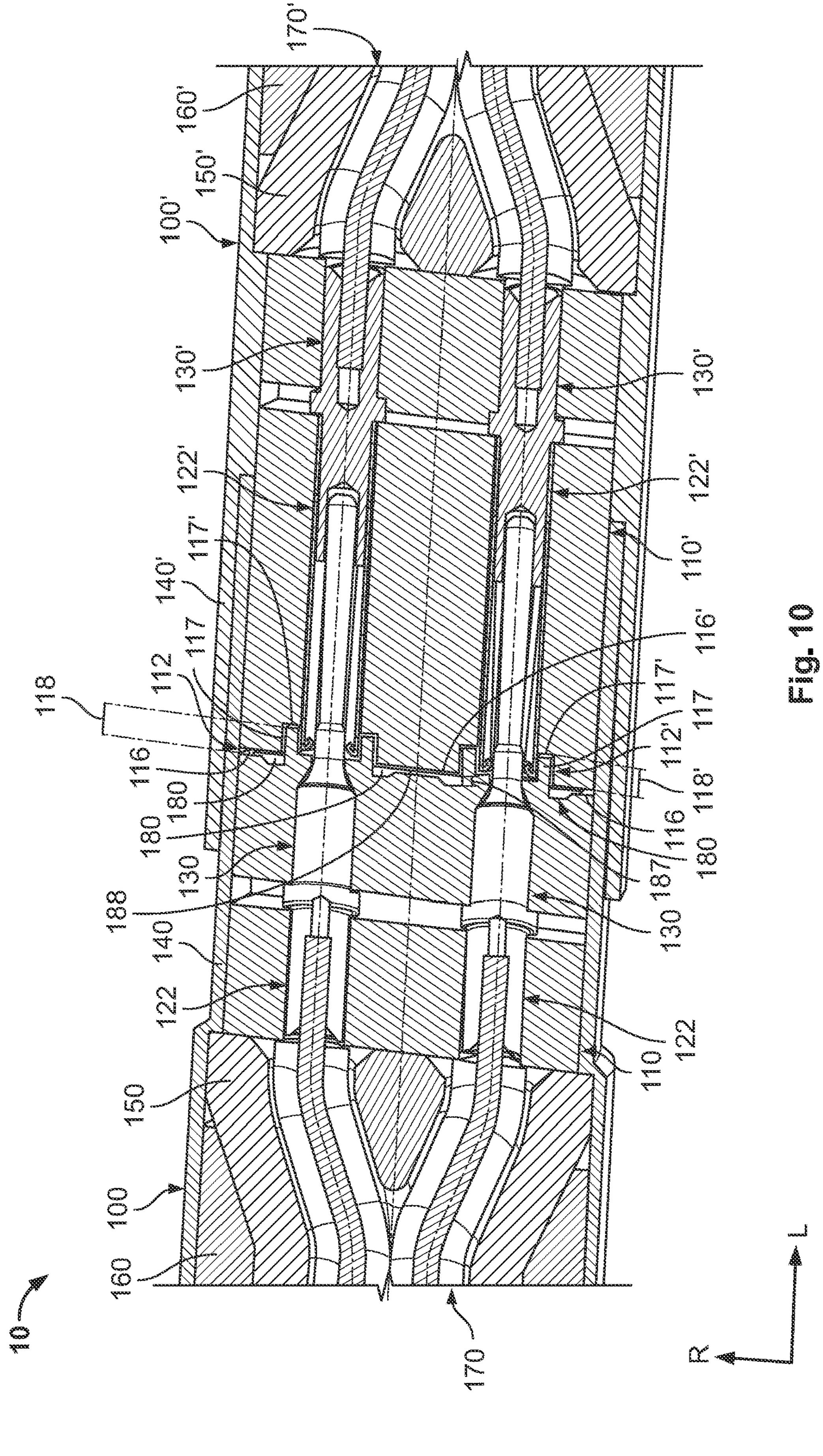
FIG. 10 is a sectional perspective view of a connector system according to another embodiment.

A connector system 10 according to another embodiment is shown in FIG. 10. The dielectric 110 of the connector 100 has a mating face 112 with a first portion 116 and a second portion 117 offset from one another by an offset distance 118 in the longitudinal direction L. The second portion 117 surrounds one of the contact passageways 122 of the dielectric 110. In the shown embodiment in which the dielectric 110 has a plurality of contact passageways 122, the mating face 112 has a corresponding number of second portions 117 each surrounding one of the contact passageways 122. The conductive layer 180 is disposed on the first portion 116 of the mating face 112 around the second portion 117.

As shown in FIG. 10, the mating connector 100' of this embodiment likewise has a mating dielectric 110' with a first mating portion 116' and a second mating portion 117' offset by a mating offset distance 118' from each other in the longitudinal direction L. The second mating portion 117' is recessed from the first mating portion 116' by the mating offset distance 118'. The number of second mating portions 117' of the mating connector 100' corresponds to the number of mating contact passageways 122' of the mating connector 100' and each of the second mating portion 117' surrounds one of the mating contact passageways 122'.

In the embodiment shown in FIG. 10, when the connector 100 is mated with the mating connector 100' in the mated position, the second portions 117 of the mating face 112 of the dielectric 110 are received in the second mating portions 117' of the mating face 112' of the mating dielectric 110'; the first portions 116 and the second portions 117 of the mating face 112 of the dielectric 110 are complementary to the first mating portions 116' and the second mating portions 117' of the mating face 112' of the mating dielectric 110'. The complementary portions 116, 117 and 116', 117' create a non-linear or jogged interface between the mating face 112 of the dielectric 110 and the mating face 112' of the mating dielectric 110'.

FIG. 10 also shows another embodiment of the conductive layer 180, in which the conductive layer 180 has a portion with a first thickness 187 in the longitudinal direction L and another portion with a second thickness 188 in the longitudinal direction L. The second thickness 188 is different from, in the shown embodiment less than, the first thickness 187. The embodiment of the conductive layer 180 having multiple different thicknesses 187, 188 does not necessarily need to be combined with the embodiment of the mating face 112 having the first and second portions 116, 117 as shown in FIG. 10, but could be combined with or without any of the other features of the various embodiments described herein.

In a connector system 10 according to another embodiment, shown in FIG. 11, the conductive layer 180 has a first section 190 disposed on the mating face 112 of the dielectric 110 and a second section 192 disposed on the mating face 112' of the mating dielectric 112'. The conductive layer 180 can thus have multiple portions on each of the mating faces 112, 112' or can be split between the mating faces 112, 112'. This embodiment can likewise be combined with any of the other embodiments described above.

What is claimed is:

1. A connector, comprising:

a dielectric having a mating face facing in a longitudinal direction in which the connector is mated with a mating connector;

an inner contact disposed in the dielectric; and a conductive layer disposed over the mating face and covering a portion of the mating face along the longitudinal direction, the conductive layer is electrically isolated from the inner contact.

2. The connector of claim 1, further comprising an outer contact disposed around the dielectric and extending beyond the mating face in the longitudinal direction.

3. The connector of claim 2, wherein the conductive layer has an outer diameter that is approximately equal to an outer diameter of the mating face and the conductive layer is electrically connected to the outer contact.

4. The connector of claim 3, wherein the conductive layer is monolithically formed in a single piece with the outer contact.

5. The connector of claim 3, wherein the conductive layer is mechanically connected to the outer contact.

6. The connector of claim 2, wherein the conductive layer has an outer diameter that is less than an outer diameter of the mating face and the conductive layer is electrically isolated from the outer contact.

7. The connector of claim 1, wherein the conductive layer extends in a plane parallel to the mating face.

8. The connector of claim 1, wherein the conductive layer is a metal material, a conductive plastic, or a foil.

9. The connector of claim 1, wherein the mating face has a recess extending into the mating face, the conductive layer is disposed within the recess and is flush with the mating face.

10. The connector of claim 1, wherein the conductive layer is one of a plurality of conductive layers separate from one another disposed on or within the mating face.

11. The connector of claim 10, wherein the inner contact is one of a plurality of inner contacts disposed in the dielectric, each of the conductive layers is disposed around one of the inner contacts.

12. The connector of claim 1, wherein the conductive layer is embedded within the dielectric adjacent to the mating face.

13. The connector of claim 1, wherein the conductive layer is attached to the mating face mechanically, with an adhesive layer, is formed around the mating face, or is plated on the mating face.

14. The connector of claim 1, wherein the mating face has a first portion and a second portion offset from one another.

15. The connector of claim 14, wherein the conductive layer is disposed on the first portion around the second portion.

16. The connector of claim 1, wherein the conductive layer has a first thickness and a second thickness different from the first thickness.

17. A connector assembly, comprising:

a connector including a dielectric having a mating face facing in a longitudinal direction, an inner contact disposed in the dielectric, and a conductive layer disposed over the mating face and covering a portion of the mating face along the longitudinal direction; and a mating connector mateable with the connector along the longitudinal direction, the mating connector has a mating dielectric with a mating face and a mating inner contact disposed in the mating dielectric, the mating face of the mating dielectric faces the mating face of the dielectric in a mated position of the connector and the mating connector, the conductive layer is disposed between the dielectric and the mating dielectric and is electrically isolated from the inner contact of the connector and the mating inner contact of the mating connector.

18. The connector assembly of claim 17, wherein the conductive layer has a first section disposed on the mating face of the dielectric and a second section disposed on the mating face of the mating dielectric.

19. The connector assembly of claim 17, wherein the mating face of the dielectric has a pair of portions offset from one another.

20. The connector assembly of claim 19, wherein the mating face of the mating dielectric has a pair of mating portions offset from one another, the portions of the mating face of the dielectric are complementary to the mating portions of the mating face of the mating dielectric in the mated position of the connector and the mating connector.

* * * * *